(12) United States Patent
Mignogna et al.

(10) Patent No.: US 10,221,256 B2
(45) Date of Patent: Mar. 5, 2019

(54) CATALYST COMPONENTS FOR THE POLYMERIZATION OF OLEFINS

(71) Applicant: BASELL POLIOLEFINE ITALIA S.R.L., Milan (IT)

(72) Inventors: Alessandro Mignogna, Ferrara (IT); Igor Kashulin, Moscow (RU); Giampiero Morini, Ferrara (IT); Ilya Nifant'ev, Moscow (RU)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 15/574,807

(22) PCT Filed: May 18, 2016

(86) PCT No.: PCT/EP2016/061078
§ 371 (c)(1),
(2) Date: Nov. 16, 2017

(87) PCT Pub. No.: WO2016/184884
PCT Pub. Date: Nov. 24, 2016

(65) Prior Publication Data
US 2018/0142044 A1 May 24, 2018

(30) Foreign Application Priority Data

May 19, 2015 (EP) .................................. 15168208

(51) Int. Cl.
*C08F 4/651* (2006.01)
*C08F 110/06* (2006.01)
(52) U.S. Cl.
CPC ............ *C08F 4/651* (2013.01); *C08F 110/06* (2013.01); *C08F 2500/12* (2013.01); *C08F 2500/15* (2013.01)

(58) Field of Classification Search
None
See application file for complete search history.

(56) References Cited

U.S. PATENT DOCUMENTS 3,661,844 A 5/1972 Stapfer
9,481,745 B2 11/2016 Mignogna et al.

FOREIGN PATENT DOCUMENTS

| CN | 105492469 A | 4/2016 |
|---|---|---|
| RU | 2298014 C2 | 4/2007 |
| WO | 2006110234 A2 | 10/2006 |
| WO | 2014160012 A2 | 10/2014 |
| WO | 2014184289 A1 | 11/2014 |

*Primary Examiner* — Catherine S Branch

(57) ABSTRACT

A solid catalyst component for the polymerization of olefins, made from or containing Mg, Ti and an electron donor of formula (I)

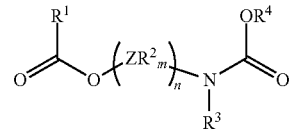

where independently, Z is a bridging group, the $R^2$ groups, equal to or different from each other, are hydrogen or a $C_1$-$C_{20}$ hydrocarbon radicals, m is a number satisfying the valences of Z and n is an integer ranging from 1 to 10, $R^1$ and $R^4$ are selected from $C_1$-$C_{15}$ hydrocarbon groups, optionally containing a heteroatom selected from halogen, P, S, N, O; and $R^3$ group, is hydrogen or $R^4$ groups.

15 Claims, No Drawings

CATALYST COMPONENTS FOR THE POLYMERIZATION OF OLEFINS

This application is the U.S. National Phase of PCT International Application PCT/EP2016/061078, filed May 18, 2016, claiming benefit of priority to European Patent Application No. 15168208.5, filed May 19, 2015, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to catalyst components for the polymerization of olefins made from or containing a Mg dihalide based support on which are supported Ti atoms and an electron donor compound containing an ester and a carbamate substituent. The present disclosure further relates to the catalysts obtained from the components and to their use in processes for the polymerization of olefins.

BACKGROUND OF THE INVENTION

Concerning the polymerization of propylene, Ziegler-Natta catalysts can be made form or containing a solid catalyst component, constituted by a magnesium dihalide on which are supported a titanium compound and an internal electron donor compound, used in combination with an Al-alkyl compound. When higher crystallinity of the polymer is desired, an external donor can be used to obtain higher isotacticity. Esters of phthalic acid can be used as internal donors in catalyst preparations. The phthalates are used as internal donors in combination with alkylalkoxysilanes as external donor.

The use of this catalyst system has raised health concerns with the use of phthalates.

SUMMARY OF THE INVENTION

In a general embodiment, the present disclosure provides a class of donors containing both a carbamate and ester substituent within a specific structure derived from an amino alcohol, for preparing a catalyst system useful in the polymerization of olefins.

In a general embodiment, the present disclosure provides a catalyst component for the polymerization of olefins, made from or containing Mg, Ti and an electron donor of formula (I)

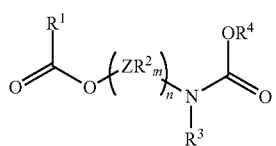

where independently, Z is selected from C, Si, Ge, O, N, S or P with the proviso that the atoms O, S, and N are not directly linked to either the ester oxygen or the carbamic nitrogen of the formula (I), the $R^2$ groups, equal to or different from each other, are hydrogen or a $C_1$-$C_{20}$ hydrocarbon radicals, optionally containing a heteroatom selected from halogen, P, S, N, O and Si, which can be fused together to form one or more cycles, m is a number satisfying the valences of Z and n is an integer ranging from 1 to 10, $R^1$ and $R^4$ are selected from $C_1$-$C_{15}$ hydrocarbon groups, optionally containing a heteroatom selected from halogen, P, S, N, O; and $R^3$ group is hydrogen or $R^4$ groups.

DETAILED DESCRIPTION OF THE INVENTION

In some embodiments, Z is selected from the group consisting of C and Si. In some embodiments, Z is carbon. In some embodiments, the ester oxygen and/or the carbamic nitrogen of formula (I) are exclusively linked directly to C or Si.

In some embodiments, the $(ZR_m^2)_n$ group of formula (I) can be selected from the group consisting of aliphatic, alicyclic and aromatic bivalent radicals, optionally substituted with $C_1$-$C_{15}$ hydrocarbon groups and/or with heteroatoms selected from halogen, P, S, N, O and Si, in which n ranges from 1 to 6 atoms, alternatively from 1 to 4.

In some embodiments, the $(ZR_m^2)_n$ group is an aliphatic or alicyclic bridging group in which n ranges from 1-6 carbon atoms. In some embodiments, the bridging groups are selected from the groups consisting of methyliden, ethane-1,2-diyl, butane-2,3-diyl, pentane-2,4-diyl, 2,2-diisobutylpropane-1,3-diyl, cyclohexane-1,2-diyl, and cyclopentane-1,2-diyl. In some embodiments, the bridging group is pentane-2,4-diyl.

In some embodiments, the bridging group is based on cyclic aromatic groups which through the carbon ring atoms can link the two oxygen of formula (I). In some embodiments, the bridging groups are phenyl groups, optionally substituted with halogens or $C_1$-$C_{20}$ alkyl radicals, bridging the oxygen atoms in position 1,2 or 1,3 or 1,4 and the naphthalene groups, optionally substituted bridging the oxygen groups in position 1,2 or 2,3 or 1,8.

In some embodiments, internal donor structures have formula (II) below

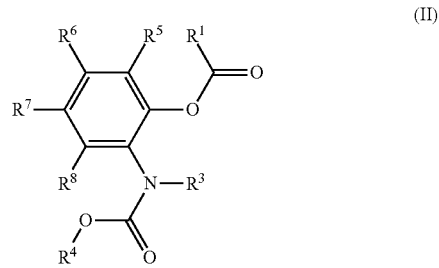

In some embodiments, the formula (II) structures have at least two of the $R^5$-$R^7$ groups are different from hydrogen. In some embodiments, the aromatic ring of formula (II) is substituted in position 3, 5 and/or 6. In some embodiments, $R^5$-$R^8$ groups are selected from $C_1$-$C_5$ alkyl groups. In some embodiments, substitution in position 3 and/or 6 is with a primary alkyl group and in position 4 and/or 5 with a tertiary alkyl group. In some embodiments, the substitution in position 3 and/or 6 is with a methyl. In some embodiments, the substitution in position 4 and/or 5 is with a tert-butyl.

In some embodiments, the aromatic bridging groups are selected from the group consisting of 1,2-phenylene, 3-methyl-1,2-phenylene, 4-chloro-1,2-phenylene, 4-(tert-butyl)-1,2-phenylene, 3,6-dimethyl-1,2-phenylene, 3,5-dimethyl-1,2-phenylene, 5-(tert-butyl)-3-methyl-1,2-phenylene, and 3,5-diisopropyl-1,2-phenylene. In some embodiments, the aromatic bridging group is 5-(tert-butyl)-3-methyl-1,2-phenylene.

In some embodiments and in the formulae (I) and (II), the $R^1$ groups are independently selected from $C_1$-$C_{15}$ alkyl groups, $C_6$-$C_{14}$ aryl groups, $C_3$-$C_{15}$ cycloalkyl groups, and $C_7$-$C_{15}$ arylalkyl or alkylaryl groups; the same applies to $R^2$ groups in formula (I) which can additionally be hydrogen. In some embodiments, the $R^1$ groups are aryl or alkylaryl groups. In some embodiments, the $R^1$ groups are phenyl groups. In some embodiments, the $R^1$ groups are phenyl groups substituted with halogen and/or $C_1$-$C_5$ alkyl groups.

In some embodiments, the $R^3$ group is independently selected from hydrogen or $C_1$-$C_{10}$ alkyl groups. In some embodiments, the $R^3$ group is hydrogen or $C_1$-$C_5$ alkyl groups. In some embodiments, the $R^3$ group is methyl.

In some embodiments, the $R^4$ group is selected from $C_1$-$C_{10}$ alkyl groups. In some embodiments, the $R^4$ group is selected from $C_1$-$C_5$ alkyl groups. In some embodiments, the $R^4$ group is ethyl.

In some embodiments, the electron donor has the formula (III)

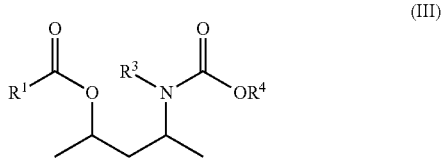

in which $R^1$ groups are phenyl groups optionally substituted with halogen and/or $C_1$-$C_5$ alkyl groups, $R^3$ is hydrogen or $C_1$-$C_{20}$ hydrocarbon group, and $R^4$ is a $C_1$-$C_{10}$ alkyl group. In some embodiments, $R^3$ is hydrogen or methyl and $R^4$ is a $C_1$-$C_5$ alkyl group. In some embodiments, these structures are in different configurations. In some embodiments, the structures are present as a mixture of stereoisomers in variable proportions. In some embodiments the syn form is predominate form. In some embodiments, the ratio syn/anti ranges from about 2:1 to about 10:1. In some embodiments, the ratio syn/anti ranges from about 7:1 to about 10:1.

In some embodiments, the final amount of electron donor compound in the solid catalyst component ranges from about 1 to about 25% by weight, based upon the total weight of the solid catalyst component, alternatively from about 3 to about 20% by weight.

In some embodiments, formulas (I) are selected from the group consisting of 4-((butoxycarbonyl)(methyl)amino)pentan-2-yl 3-chlorobenzoate, 4-((butoxycarbonyl)(methyl)amino)pentan-2-yl 4-chlorobenzoate, 4-((ethoxycarbonyl)(ethyl)amino)pentan-2-yl 3-chlorobenzoate, 4-((ethoxycarbonyl)(ethyl)amino)pentan-2-yl 4-chlorobenzoate, 4-((ethoxycarbonyl)(ethyl)amino)pentan-2-yl 4-propylbenzoate, 4-((ethoxycarbonyl)(ethyl)amino)pentan-2-yl benzoate, 4-((ethoxycarbonyl)(methyl)amino)-3-methylpentan-2-yl 3-chlorobenzoate, 4-((ethoxycarbonyl)(methyl)amino)-3-methylpentan-2-yl 4-propylbenzoate, 4-((ethoxycarbonyl)(methyl)amino)-3-methylpentan-2-yl benzoate, 4-((ethoxycarbonyl)(methyl)amino)pentan-2-yl 3-chlorobenzoate, 4-((ethoxycarbonyl)(methyl)amino)pentan-2-yl 3-methyl butanoate, 4-((ethoxycarbonyl)(methyl)amino)pentan-2-yl 4-chlorobenzoate, 4-((ethoxycarbonyl)(methyl)amino)pentan-2-yl 4-propylbenzoate, 4-((ethoxycarbonyl)(methyl)amino)pentan-2-yl acetate, 4-((ethoxycarbonyl)(methyl)amino)pentan-2-yl benzoate, 4-((ethoxycarbonyl)(methyl)amino)pentan-2-yl pivalate, 4-((ethoxycarbonyl)amino)pentan-2-yl 3-chlorobenzoate, 4-((ethoxycarbonyl)amino)pentan-2-yl 4-chlorobenzoate, 4-((ethoxycarbonyl)amino)pentan-2-yl 4-propylbenzoate, 4-((ethoxycarbonyl)amino)pentan-2-yl benzoate, 4-((methoxycarbonyl)(methyl)amino)pentan-2-yl benzoate, 4-(benzyl(ethoxycarbonyl)amino)pentan-2-yl 3-chlorobenzoate, 4-(benzyl(ethoxycarbonyl)amino)pentan-2-yl 4-chlorobenzoate, 4-(benzyl(ethoxycarbonyl)amino)pentan-2-yl 4-propylbenzoate, 4-(benzyl(ethoxycarbonyl)amino)pentan-2-yl benzoate, 4-(methyl(propoxycarbonyl)amino)pentan-2-yl 4-propylbenzoate, (9-(((ethoxycarbonyl)(methyl)amino)methyl)-9H-fluoren-9-yl)methyl 3-chlorobenzoate, (9-(((ethoxycarbonyl)(methyl)amino)methyl)-9H-fluoren-9-yl)methyl 4-chlorobenzoate, (9-(((ethoxycarbonyl)(methyl)amino)methyl)-9H-fluoren-9-yl)methyl 4-propylbenzoate, (9-(((ethoxycarbonyl)(methyl)amino)methyl)-9H-fluoren-9-yl)methyl benzoate, 2-(((ethoxycarbonyl)(methyl)amino)methyl)-2-isobutyl-4-methylpentyl benzoate, 2-(((ethoxycarbonyl)(methyl)amino)methyl)-2-isopropyl-3-methylbutyl 4-propylbenzoate, 2-(((ethoxycarbonyl)(methyl)amino)methyl)-2-isopropyl-5-methylhexyl 3-chlorobenzoate, 2-(((ethoxycarbonyl)(methyl)amino)methyl)-2-isopropyl-5-methylhexyl 4-propylbenzoate, 2-(((ethoxycarbonyl)(methyl)amino)methyl)phenyl 4-chlorobenzoate, 2-(((ethoxycarbonyl)(methyl)amino)methyl)phenyl 4-propylbenzoate, 2-(((ethoxycarbonyl)(methyl)amino)methyl)phenyl benzoate, 2-(1-((ethoxycarbonyl)(methyl)amino)ethyl)phenyl 4-chlorobenzoate, 3-((ethoxycarbonyl)(methyl)amino)-2,2-dimethylpropyl 3-chlorobenzoate, 3-((ethoxycarbonyl)(methyl)amino)-2,2-dimethylpropyl 4-propylbenzoate, 3-((ethoxycarbonyl)(methyl)amino)-2,2-dimethylpropyl benzoate, 3-((ethoxycarbonyl)(methyl)amino)propyl 3-chlorobenzoate, 3-((ethoxycarbonyl)(methyl)amino)propyl 4-chlorobenzoate, 3-((ethoxycarbonyl)(methyl)amino)propyl 4-propylbenzoate, 3-((ethoxycarbonyl)(methyl)amino)propyl benzoate, 4-(tert-butyl)-2-(1-((ethoxycarbonyl)(methyl)amino)ethyl)-6-methylphenyl 4-propylbenzoate, 2-((ethoxycarbonyl)(methyl)amino)-1,2-diphenylethyl 4-propylbenzoate, 2-((ethoxycarbonyl)(methyl)amino)ethyl 4-propylbenzoate, 2-((ethoxycarbonyl)(methyl)amino)ethyl benzoate, 2-((ethoxycarbonyl)(methyl)amino)propyl 4-propylbenzoate, 3-(((ethoxycarbonyl)(methyl)amino)methyl)-2-isopropyl-4-methylpentyl 4-propylbenzoate, 3-((ethoxycarbonyl)(ethyl)amino)butan-2-yl 4-propylbenzoate, 4-((ethoxycarbonyl)(methyl)amino)-2,5-dimethylhexan-3-yl 4-propylbenzoate, 4-((ethoxycarbonyl)amino)-2,5-dimethylhexan-3-yl 4-propylbenzoate, 2-((ethoxycarbonyl)(ethyl)amino)phenyl 3-chlorobenzoate, 2-((ethoxycarbonyl)(ethyl)amino)phenyl 4-chlorobenzoate, 2-((ethoxycarbonyl)(ethyl)amino)phenyl 4-propylbenzoate, 2-((ethoxycarbonyl)(ethyl)amino)phenyl acetate, 2-((ethoxycarbonyl)(ethyl)amino)phenyl benzoate, 2-((ethoxycarbonyl)(ethyl)amino)phenyl pivalate, 2-((ethoxycarbonyl)(methyl)amino)phenyl 3-chlorobenzoate, 2-((ethoxycarbonyl)(methyl)amino)phenyl 4-chlorobenzoate, 2-((ethoxycarbonyl)(methyl)amino)phenyl 4-propylbenzoate, 2-((ethoxycarbonyl)(methyl)amino)phenyl acetate, 2-((ethoxycarbonyl)(methyl)amino)phenyl benzoate, 2-((ethoxycarbonyl)(methyl)amino)phenyl pivalate, 2-((ethoxycarbonyl)amino)phenyl 3-chlorobenzoate, 2-((ethoxycarbonyl)amino)phenyl 4-chlorobenzoate, 2-((ethoxycarbonyl)amino)phenyl 4-propylbenzoate, 2-((ethoxycarbonyl)amino)phenyl acetate, 2-((ethoxycarbonyl)amino)phenyl benzoate, 2-((ethoxycarbonyl)amino)phenyl pivalate, 2-((ethoxycarbonyl)(ethyl)amino)-6-methylphenyl 3-chlorobenzoate, 2-((ethoxycarbonyl)(ethyl)

amino)-6-methylphenyl 4-chlorobenzoate, 2-((ethoxycarbonyl)(ethyl)amino)-6-methylphenyl 4-propylbenzoate, 2-((ethoxycarbonyl)(ethyl)amino)-6-methylphenyl acetate, 2-((ethoxycarbonyl)(ethyl)amino)-6-methylphenyl benzoate, 2-((ethoxycarbonyl)(ethyl)amino)-6-methylphenyl pivalate, 2-((ethoxycarbonyl)(methyl)amino)-6-methylphenyl 3-chlorobenzoate, 2-((ethoxycarbonyl)(methyl)amino)-6-methylphenyl 4-chlorobenzoate, 2-((ethoxycarbonyl)(methyl)amino)-6-methylphenyl 4-propylbenzoate, 2-((ethoxycarbonyl)(methyl)amino)-6-methylphenyl acetate, 2-((ethoxycarbonyl)(methyl)amino)-6-methylphenyl benzoate, 2-((ethoxycarbonyl)(methyl)amino)-6-methylphenyl pivalate, 2-((ethoxycarbonyl)amino)-6-methylphenyl 3-chlorobenzoate, 2-((ethoxycarbonyl)amino)-6-methylphenyl 4-chlorobenzoate, 2-((ethoxycarbonyl)amino)-6-methylphenyl 4-propylbenzoate, 2-((ethoxycarbonyl)amino)-6-methylphenyl acetate, 2-((ethoxycarbonyl)amino)-6-methylphenyl benzoate, 2-((ethoxycarbonyl)amino)-6-methylphenyl pivalate, 2-((ethoxycarbonyl)(ethyl)amino)-4,6-dimethylphenyl 3-chlorobenzoate, 2-((ethoxycarbonyl)(ethyl)amino)-4,6-dimethylphenyl 4-chlorobenzoate, 2-((ethoxycarbonyl)(ethyl)amino)-4,6-dimethylphenyl 4-propylbenzoate, 2-((ethoxycarbonyl)(ethyl)amino)-4,6-dimethylphenyl acetate, 2-((ethoxycarbonyl)(ethyl)amino)-4,6-dimethylphenyl benzoate, 2-((ethoxycarbonyl)(ethyl)amino)-4,6-dimethylphenyl pivalate, 2-((ethoxycarbonyl)(methyl)amino)-4,6-dimethylphenyl 3-chlorobenzoate, 2-((ethoxycarbonyl)(methyl)amino)-4,6-dimethylphenyl 4-chlorobenzoate, 2-((ethoxycarbonyl)(methyl)amino)-4,6-dimethylphenyl 4-propylbenzoate, 2-((ethoxycarbonyl)(methyl)amino)-4,6-dimethylphenyl acetate, 2-((ethoxycarbonyl)(methyl)amino)-4,6-dimethylphenyl benzoate, 2-((ethoxycarbonyl)(methyl)amino)-4,6-dimethylphenyl pivalate, 2-((ethoxycarbonyl)amino)-4,6-dimethylphenyl 3-chlorobenzoate, 2-((ethoxycarbonyl)amino)-4,6-dimethylphenyl 4-chlorobenzoate, 2-((ethoxycarbonyl)amino)-4,6-dimethylphenyl 4-propylbenzoate, 2-((ethoxycarbonyl)amino)-4,6-dimethylphenyl acetate, 2-((ethoxycarbonyl)amino)-4,6-dimethylphenyl benzoate, 2-((ethoxycarbonyl)amino)-4,6-dimethylphenyl pivalate, 4-(tert-butyl)-2-((ethoxycarbonyl)(ethyl)amino)-6-methylphenyl 3-chlorobenzoate, 4-(tert-butyl)-2-((ethoxycarbonyl)(ethyl)amino)-6-methylphenyl 4-chlorobenzoate, 4-(tert-butyl)-2-((ethoxycarbonyl)(ethyl)amino)-6-methylphenyl 4-propylbenzoate, 4-(tert-butyl)-2-((ethoxycarbonyl)(ethyl)amino)-6-methylphenyl acetate, 4-(tert-butyl)-2-((ethoxycarbonyl)(ethyl)amino)-6-methylphenyl benzoate, 4-(tert-butyl)-2-((ethoxycarbonyl)(ethyl)amino)-6-methylphenyl pivalate, 4-(tert-butyl)-2-((ethoxycarbonyl)(methyl)amino)-6-methylphenyl 3-chlorobenzoate, 4-(tert-butyl)-2-((ethoxycarbonyl)(methyl)amino)-6-methylphenyl 4-chlorobenzoate, 4-(tert-butyl)-2-((ethoxycarbonyl)(methyl)amino)-6-methylphenyl 4-propylbenzoate, 4-(tert-butyl)-2-((ethoxycarbonyl)(methyl)amino)-6-methylphenyl acetate, 4-(tert-butyl)-2-((ethoxycarbonyl)(methyl)amino)-6-methylphenyl benzoate, 4-(tert-butyl)-2-((ethoxycarbonyl)(methyl)amino)-6-methylphenyl pivalate, 4-(tert-butyl)-2-((ethoxycarbonyl)amino)-6-methylphenyl 3-chlorobenzoate, 4-(tert-butyl)-2-((ethoxycarbonyl)amino)-6-methylphenyl 4-chlorobenzoate, 4-(tert-butyl)-2-((ethoxycarbonyl)amino)-6-methylphenyl 4-propylbenzoate, 4-(tert-butyl)-2-((ethoxycarbonyl)amino)-6-methylphenyl acetate, 4-(tert-butyl)-2-((ethoxycarbonyl)amino)-6-methylphenyl benzoate, 4-(tert-butyl)-2-((ethoxycarbonyl)amino)-6-methylphenyl pivalate, 2-(benzyl(ethoxycarbonyl)amino)-4-(tert-butyl)-6-methylphenyl 3-chlorobenzoate, 2-(benzyl (ethoxycarbonyl)amino)-4-(tert-butyl)-6-methylphenyl 4-chlorobenzoate, 2-(benzyl(ethoxycarbonyl)amino)-4-(tert-butyl)-6-methylphenyl 4-propylbenzoate, 2-(benzyl (ethoxycarbonyl)amino)-4-(tert-butyl)-6-methylphenyl benzoate, 4-(tert-butyl)-2-((ethoxycarbonyl)(isobutyl)amino)-6-methylphenyl 3-chlorobenzoate, 4-(tert-butyl)-2-((ethoxycarbonyl)(isobutyl)amino)-6-methylphenyl 4-chlorobenzoate, 4-(tert-butyl)-2-((ethoxycarbonyl)(isobutyl)amino)-6-methylphenyl 4-propylbenzoate, 4-(tert-butyl)-2-((ethoxycarbonyl)(isobutyl)amino)-6-methylphenyl benzoate, 4-(tert-butyl)-2-((ethoxycarbonyl)(phenyl)amino)-6-methylphenyl 3-chlorobenzoate, 4-(tert-butyl)-2-((ethoxycarbonyl)(phenyl)amino)-6-methylphenyl 4-chlorobenzoate, 4-(tert-butyl)-2-((ethoxycarbonyl)(phenyl)amino)-6-methylphenyl 4-propylbenzoate, 4-(tert-butyl)-2-((ethoxycarbonyl)(phenyl)amino)-6-methylphenyl benzoate, 4-(tert-butyl)-2-((ethoxycarbonyl)(ethyl)amino) phenyl 3-chlorobenzoate, 4-(tert-butyl)-2-((ethoxycarbonyl)(ethyl)amino)phenyl 4-chlorobenzoate, 4-(tert-butyl)-2-((ethoxycarbonyl)(ethyl)amino)phenyl 4-propylbenzoate, 4-(tert-butyl)-2-((ethoxycarbonyl)(ethyl)amino)phenyl acetate, 4-(tert-butyl)-2-((ethoxycarbonyl)(ethyl)amino) phenyl benzoate, 4-(tert-butyl)-2-((ethoxycarbonyl)(ethyl)amino)phenyl pivalate, 4-(tert-butyl)-2-((ethoxycarbonyl)(methyl)amino)phenyl 3-chlorobenzoate, 4-(tert-butyl)-2-((ethoxycarbonyl)(methyl)amino)phenyl 4-chlorobenzoate, 4-(tert-butyl)-2-((ethoxycarbonyl)(methyl)amino)phenyl 4-propylbenzoate, 4-(tert-butyl)-2-((ethoxycarbonyl)(methyl)amino)phenyl acetate, 4-(tert-butyl)-2-((ethoxycarbonyl)(methyl)amino)phenyl benzoate, 4-(tert-butyl)-2-((ethoxycarbonyl)(methyl)amino)phenyl pivalate, 4-(tert-butyl)-2-((ethoxycarbonyl)amino)phenyl 3-chlorobenzoate, 4-(tert-butyl)-2-((ethoxycarbonyl)amino)phenyl 4-chlorobenzoate, 4-(tert-butyl)-2-((ethoxycarbonyl)amino)phenyl 4-propylbenzoate, 4-(tert-butyl)-2-((ethoxycarbonyl)amino) phenyl acetate, 4-(tert-butyl)-2-((ethoxycarbonyl)amino) phenyl benzoate, 4-(tert-butyl)-2-((ethoxycarbonyl)amino) phenyl pivalate, 1-((ethoxycarbonyl)amino)naphthalen-2-yl benzoate, 2-((ethoxycarbonyl)(methyl)amino)naphthalen-1-yl 3-chlorobenzoate, 2-((ethoxycarbonyl)(methyl)amino) naphthalen-1-yl 4-chlorobenzoate, 2-((ethoxycarbonyl)(methyl)amino)naphthalen-1-yl 4-propylbenzoate, 2-((ethoxycarbonyl)(methyl)amino)naphthalen-1-yl benzoate, 2-((ethoxycarbonyl)amino)naphthalen-1-yl 3-chlorobenzoate, 2-((ethoxycarbonyl)amino)naphthalen-1-yl 4-chlorobenzoate, 2-((ethoxycarbonyl)amino)naphthalen-1-yl 4-propylbenzoate, 2-((ethoxycarbonyl)amino)naphthalen-1-yl benzoate, 3-((ethoxycarbonyl)(methyl)amino)naphthalen-2-yl 4-chlorobenzoate, 3-((ethoxycarbonyl)amino) naphthalen-2-yl 4-chlorobenzoate, 3-((ethoxycarbonyl) amino)naphthalen-2-yl benzoate, 8-((ethoxycarbonyl)(methyl)amino)naphthalen-1-yl 4-propylbenzoate, 8-((ethoxycarbonyl)amino)naphthalen-1-yl 4-chlorobenzoate, 8-((ethoxycarbonyl)amino)naphthalen-1-yl benzoate, 4-((ethoxycarbonyl)(propyl)amino)pentan-2-yl 4-methylbenzoate, 4-(butyl(ethoxycarbonyl)amino)pentan-2-yl benzoate, 4-(butyl(ethoxycarbonyl)amino)pentan-2-yl 4-methylbenzoate, 4-(butyl(ethoxycarbonyl)amino)pentan-2-yl 4-chlorobenzoate, 4-(butyl(ethoxycarbonyl)amino)pentan-2-yl 4-fluorobenzoate, 4-((ethoxycarbonyl)(4-fluorophenyl)amino)pentan-2-yl 4-propylbenzoate, and 4-(butyl(ethoxycarbonyl)amino)pentan-2-yl 3-methylbutanoate.

In some embodiments, the formula (I) and (II) compounds are prepared by reacting an aminoalcohol HO-A-NRH with a chloroformate. Then the monocarbamate-monoalcohol is reacted with an acyl chloride. Both steps are carried out in presence of a base.

In some embodiments and in the solid catalyst component of the disclosure, the amount of Ti atoms is higher than about 2.5% wt, alternatively higher than about 3.0% with respect to the total weight of the catalyst component.

The catalyst components of the disclosure are made from or contain, in addition to the electron donors, Ti, Mg and halogen. In some embodiments, the catalyst components are made from or contain a titanium compound, having at least a Ti-halogen bond and the electron donor compounds supported on a Mg halide. In some embodiments, the magnesium halide is $MgCl_2$ in active form.

In some embodiments, the titanium compounds used in the catalyst component of the present disclosure are $TiCl_4$ and $TiCl_3$. In some embodiments, the titanium compounds are Ti-haloalcoholates of formula $Ti(OR)_{m-y}X_y$, where m is the valence of titanium, y is a number between 1 and m−1, X is halogen and R is a hydrocarbon radical having from 1 to 10 carbon atoms.

In some embodiments, the preparation of the solid catalyst component includes a reaction between magnesium alcoholates or chloroalcoholates and an excess of $TiCl_4$ in the presence of the electron donor compounds at a temperature of about 80 to 120° C. In some embodiments, the chloroalcoholates are prepared according to U.S. Pat. No. 4,220,554, incorporated herein by reference.

In some embodiments, the solid catalyst component is prepared by reacting a titanium compound of formula $Ti(OR)_{m-y}X_y$, where m is the valence of titanium and y is a number between 1 and m, with a magnesium chloride deriving from an adduct of formula $MgCl_2 \cdot pROH$, where p is a number between about 0.1 and about 6, alternatively from about 2 to about 3.5, and R is a hydrocarbon radical having 1-18 carbon atoms. In some embodiments, the titanium compound is $TiCl_4$. In some embodiments, the adduct is prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. In some embodiments, the spherical adducts prepared are as disclosed in U.S. Pat. Nos. 4,399,054 and 4,469,648, both incorporated herein by reference. The adduct can be directly reacted with Ti compound or subjected to thermal controlled dealcoholation (80-130° C.), thereby obtaining an adduct in which the number of moles of alcohol is lower than about 3, alternatively between about 0.1 and about 2.5. In some embodiments, the reaction with the Ti compound is carried out by suspending the adduct (dealcoholated or as such) in cold $TiCl_4$ (about 0° C.); the mixture is heated up to 80-130° C. and kept at this temperature for 0.5-2 hours. The treatment with $TiCl_4$ can be carried out one or more times. In some embodiments, the electron donor compound is added during the treatment with $TiCl_4$. In some embodiments, the preparation of catalyst components in spherical form occurs as disclosed in European Patent Application Nos. EP-A-395083, EP-A-553805, EP-A-553806, and EPA601525 and Patent Cooperation Treaty Publication No. WO98/44009, incorporated herein by reference.

In some embodiments, the solid catalyst components show a surface area (by B.E.T. method) in the range between about 20 and about 500 $m^2/g$, alternatively between about 50 and about 400 $m^2/g$, and a total porosity (by B.E.T. method) higher than about 0.2 $cm^3/g$, alternatively between about 0.2 and about 0.6 $cm^3/g$. In some embodiments, the porosity (Hg method) due to pores with radius up to 10.000 Å range from about 0.3 to about 1.5 $cm^3/g$, alternatively from about 0.45 to about 1 $cm^3/g$.

In some embodiments, the solid catalyst component has an average particle size ranging from about 5 to about 120 μm, alternatively from about 10 to about 100 μm.

In some embodiments, the electron donor compounds can be added as such or obtained in situ by using an appropriate precursor capable to be transformed into the electron donor compound.

In some embodiments, the final amount of the electron donor compound of formula (I) is such that the electron donor's compound molar ratio with respect to the Ti atoms is from about 0.01 to about 2, alternatively from about 0.05 to about 1.5.

In some embodiments, the solid catalyst components are converted into catalysts for the polymerization of olefins by reacting the solid catalyst components with organoaluminum compounds.

In some embodiments, a catalyst for the polymerization of olefins $CH_2=CHR$ wherein R is hydrogen or a hydrocarbyl radical with 1-12 carbon atoms, is provided, which catalyst is made from or containing a product obtained by contacting:
(i) a solid catalyst component and
(ii) an alkylaluminum compound and optionally,
(iii) an external electron donor compound.

In some embodiments, the alkyl-Al compound (ii) is selected from the group consisting of trialkyl aluminum compounds. In some embodiments, the trialkyl aluminum compound is selected from the group consisting of triethylaluminum, triisobutylaluminum, tri-n-butylaluminum, tri-n-hexylaluminum, and tri-n-octylaluminum. In some embodiments, the alkyl-Al compound is selected from the group consisting of alkylaluminum halides, alkylaluminum hydrides or alkylaluminum sesquichlorides, such as $AlEt_2Cl$ and $Al_2Et_3Cl_3$, alternatively in mixture with trialkylaluminums.

In some embodiments, the external electron-donor compounds are selected from the group consisting of silicon compounds, ethers, esters, amines, heterocyclic compounds, and ketones. In some embodiments, the external electron-donor compound is 2,2,6,6-tetramethylpiperidine.

In some embodiments, the external donor compounds are silicon compounds of formula $(R_7)_a(R_8)_bSi(OR_9)_c$, where a and b are integers from 0 to 2, c is an integer from 1 to 4 and the sum (a+b+c) is 4; $R_7$, $R_8$, and $R_9$, are radicals with 1-18 carbon atoms optionally containing heteroatoms. In some embodiments, the external donor compounds are silicon compounds in which a is 1, b is 1, c is 2, at least one of $R_7$ and $R_8$ is selected from branched alkyl, cycloalkyl or aryl groups with 3-10 carbon atoms optionally containing heteroatoms and $R_9$ is a $C_1$-$C_{10}$ alkyl group. In some embodiments, $R_9$ is methyl. In some embodiments, the external donor compounds are silicon compounds selected from the group consisting of methylcyclohexyldimethoxysilane (C donor), diphenyldimethoxysilane, methyl-t-butyldimethoxysilane, dicyclopentyldimethoxysilane (D donor), diisopropyldimethoxysilane, (2-ethylpiperidinyl)t-butyldimethoxysilane, (2-ethylpiperidinyl)thexyldimethoxysilane, (3,3,3-trifluoro-n-propyl)(2-ethylpiperidinyl)dimethoxysilane, methyl(3,3,3-trifluoro-n-propyl)dimethoxysilane, and N,N-diethylaminotriethoxysilane. In some embodiments, the external donor compounds are silicon compounds in which a is 0, c is 3, $R_8$ is a branched alkyl or cycloalkyl group, optionally containing heteroatoms, and $R_9$ is methyl. In some embodiments, the silicon compounds are selected from the group consisting of cyclohexyltrimethoxysilane, t-butyltrimethoxysilane and thexyltrimethoxysilane.

In some embodiments, the electron donor compound (iii) is used in such an amount to give a molar ratio between the organoaluminum compound and the electron donor compound (iii) of from about 0.1 to about 500, alternatively from about 1 to about 300, alternatively from about 3 to about 100.

In some embodiments, the catalyst components are able to produce polypropylene with an activity higher than about 40 Kg/gcat, alternatively higher than about 50 Kg/gcat and a xylene insolubility at 25° C. higher than about 96%, alternatively higher than about 97, alternatively higher than about 98%. In some embodiments, the polymerization conditions are as set forth in the experimental section. In some embodiments, the catalyst components are with an aluminum alkyl compound and an alkyl alkoxysilane.

In some embodiments, a process for the polymerization or copolymerization of olefins $CH_2$=CHR, wherein R is hydrogen or a hydrocarbyl radical with 1-12 carbon atoms, carried out in the presence of a catalyst, is provided, which catalyst is made from or containing a product of a reaction between:
(i) a solid catalyst component;
(ii) an alkylaluminum compound and,
(iii) optionally an electron-donor compound (external donor).

In some embodiments, the polymerization process is carried out as a slurry polymerization using as diluent an inert hydrocarbon solvent or as a bulk polymerization using a liquid monomer as a reaction medium. In some embodiments, the polymerization process is carried out in gas-phase operating in one or more fluidized or mechanically agitated bed reactors.

In some embodiments, the polymerization is carried out at temperature of from about 20 to about 120° C., alternatively from about 40 to about 80° C. In some embodiments, the polymerization is carried out in gas-phase with the operating pressure in the range between about 0.5 and about 5 MPa, alternatively between about 1 and about 4 MPa. In some embodiments and in the bulk polymerization, the operating pressure ranges between about 1 and about 8 MPa, alternatively between about 1.5 and about 5 MPa.

The following examples are given to illustrate the disclosure without being intended as limiting it.

Characterizations

Determination of X.I.

In a round-bottomed flask provided with a cooler and a reflux condenser, 2.5 g of polymer and 250 ml of o-xylene were placed and kept under nitrogen. The mixture was heated to 135° C. and kept under stirring for about 60 minutes. The final solution was allowed to cool to 25° C. under continuous stirring, and the insoluble polymer was then filtered. The filtrate was then evaporated in a nitrogen flow at 140° C. to reach a constant weight. The content of the xylene-soluble fraction was expressed as a percentage of the original 2.5 grams and then, by difference, the X.I. %.

Determination of Donors.

The content of electron donor was determined by gas-chromatography. The solid component was dissolved in acidic water. The solution was extracted with ethyl acetate, an internal standard was added, and a sample of the organic phase was analyzed in a gas chromatograph, to determine the amount of donor present at the starting catalyst compound.

Melt Flow Rate (MFR)

The melt flow rate MIL of the polymer was determined according to ISO 1133 (230° C., 2.16 Kg).

EXAMPLES

General Procedure for Preparation of the Spherical Adducts

Procedure for Preparation of the Spherical Adducts A and B

An initial amount of microspheroidal $MgCl_2 \cdot 2.8C_2H_5OH$ was prepared according to the method described in Example 2 of Patent Cooperation Treaty Publication No. WO98/44009, incorporated herein by reference but operating on larger scale. This adduct is called adduct A. The solid adduct A was then subjected to thermal dealcoholation at increasing temperatures from 30 to 130° C. and operating in nitrogen current until reaching an alcohol content of 1.9 moles per mol of $MgCl_2$. This partially dealcoholated adduct is called adduct B.

General Procedure for the Polymerization of Propylene

A 4 liter steel autoclave equipped with a stirrer, pressure gauge, thermometer, catalyst feeding system, monomer feeding lines and thermostating jacket, was purged with nitrogen flow at 70° C. for one hour. Then, at 30° C. under propylene flow, the autoclave was charged in sequence with 75 mL of anhydrous hexane, 0.76 g of $AlEt_3$, the external electron donor indicated in Table 1 (if used) and 0.006÷0.010 g of solid catalyst component. The autoclave was closed; subsequently 2.0 NL of hydrogen (1.5 NL if C donor is used as ED) were added. Then, under stirring, 1.2 kg of liquid propylene was fed. The temperature was raised to 70° C. in five minutes and the polymerization was carried out at this temperature for two hours. At the end of the polymerization, the non-reacted propylene was removed; the polymer was recovered and dried at 70° C. under vacuum for three hours. Then the polymer was weighed and fractionated with o-xylene to determine the amount of the xylene insoluble (X.I.) fraction.

Donor Synthesis

The internal donors used in the examples 1-12 were prepared using the following synthetic route:

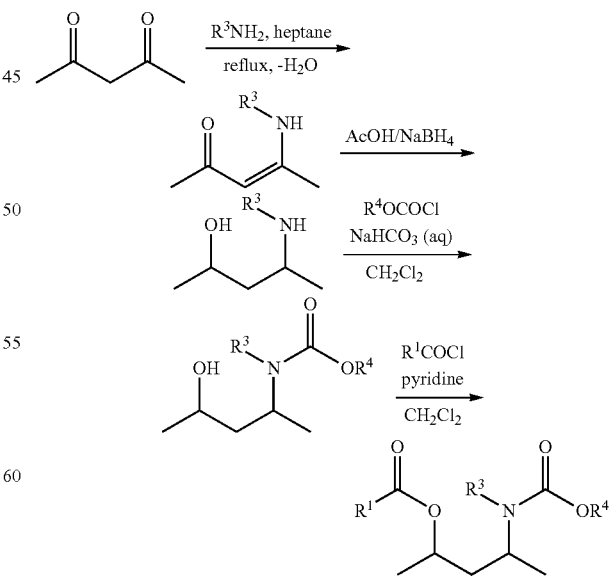

see: J. Braz. Chem. Soc., Vol. 15, No. 6, 971-975, 2004

The internal donor used in the comparative example 1 was prepared according to U.S. Published Patent Application No. US2015/0259448, incorporated herein by reference.

Examples 1-12 and Comp. Ex.1

Preparation of Solid Catalyst Component and Polymerization

Into a 500 cm$^3$ round bottom flask, equipped with mechanical stirrer, cooler and thermometer, 250 cm$^3$ of TiCl$_4$ were introduced at room temperature under nitrogen atmosphere. After cooling to 0° C., while stirring, the internal donor of synthetic example 1 and 10.0 g of the spherical adduct A were sequentially added into the flask. The charged internal donor was in an amount sufficient to charge a Mg/donor molar ratio of about 6. The temperature was raised to 100° C. and maintained for 2 hours. Thereafter, stirring was stopped, the solid product was allowed to settle and the supernatant liquid was siphoned off at 100° C. After the supernatant was removed, additional fresh TiCl$_4$ was added to reach the initial liquid volume again. The mixture was then heated at 120° C. and kept at this temperature for 1 hour. Stirring was stopped again. The solid was allowed to settle. The supernatant liquid was siphoned off. The solid was washed with anhydrous hexane six times (6×100 cm$^3$) in temperature gradient down to 60° C. and one time (100 cm$^3$) at room temperature. The solid was then dried under vacuum. The solid catalyst components were tested in polymerization of propylene. The results are listed in Table 1.

Example 13

Preparation of Solid Catalyst Component and Polymerization

Into a 500 cm$^3$ round bottom flask, equipped with mechanical stirrer, cooler and thermometer, 250 cm$^3$ of TiCl$_4$ were introduced at room temperature under nitrogen atmosphere. After cooling to 0° C., while stirring, 10.0 g of the spherical adduct B were sequentially added into the flask. The temperature was raised to 120° C. and maintained for 1 hour. The internal donor was charged when the internal temperature reaches 40° C. The charged internal donor was in an amount sufficient to charge a Mg/donor molar ratio of about 8. After 1 hour at 120° C. stirring was stopped, the solid product was allowed to settle and the supernatant liquid was siphoned off at 120° C. After the supernatant was removed, additional fresh TiCl$_4$ was added to reach the initial liquid volume again. The mixture was then heated at 120° C. and kept at this temperature for 30 minutes. Stirring was stopped again. The solid was allowed to settle. The supernatant liquid was siphoned off. After the supernatant was removed, additional fresh TiCl$_4$ was added to reach the initial liquid volume again. The mixture was then heated at 120° C. and kept at this temperature for 15 minutes. Stirring was stopped again. The solid was allowed to settle. The supernatant liquid was siphoned off. The solid was washed four times with anhydrous heptane (4×100 cm$^3$) at 90° C. and two times with anhydrous iso-hexane (2×100 cm$^3$) at 25° C. then dried under vacuum. The solid catalyst components were tested in polymerization of propylene. The results are listed in Table 1.

TABLE 1

| | Catalyst composition | | | | Polymerization | | |
| | Internal Donor | | Ti | | Activity | XI | MIL |
| Ex. | Structure/Name | % wt | % wt | ED | kg/g | % wt | g/10' |
| 1 | 4-((ethoxycarbonyl)(methyl)amino)pentan-2-yl 3-chlorobenzoate, syn/anti 9:1 | 19.8 | 5.3 | D | 52 | 96.6 | 1.3 |
| 2 | 4-((ethoxycarbonyl)(methyl)amino)pentan-2-yl 4-propylbenzoate, syn/anti 8:2 | 18.6 | 4.5 | D | 104 | 98.5 | 0.7 |
| 3 | 4-(tert-butyl)-2-((ethoxycarbonyl)amino)-6-methylphenyl benzoate | n.d. | 4.8 | D | 44 | 96.5 | 5.6 |

TABLE 1-continued

| | Catalyst compostion | | | | Polymerization | | |
| --- | --- | --- | --- | --- | --- | --- | --- |
| | Internal Donor | | Ti | | Activity | XI | MIL |
| Ex. | Structure/Name | % wt | % wt | ED | kg/g | % wt | g/10' |
| 4 | 4-(benzyl(ethoxycarbonyl)amino)pentan-2-yl benzoate | 19.1 | 4.3 | D | 44 | 97.3 | 1.4 |
| 5 | 4-((ethoxycarbonyl)(ethyl)amino)pentan-2-yl 4-propylbenzoate | 16.3 | 4.4 | D | 97 | 98.8 | 0.4 |
| 6 | 4-((ethoxycarbonyl)(propyl)amino)pentan-2-yl 4-methylbenzoate, syn/anti 9:1 | 18.9 | n.d. | D | 81 | 98.8 | 0.6 |
| 7 | 4-(butyl)ethoxycarbonyl)amino)pentan-2-yl benzoate, syn/anti 8:2 | 15.5 | 4.5 | D | 73 | 98.7 | 0.5 |
| 8 | 4-(butyl)ethoxycarbonyl)amino)pentan-2-yl 4-methylbenzoate, syn/anti 8:2 | 21.2 | 4.7 | C | 70 | 98.0 | 0.6 |

TABLE 1-continued

| | Catalyst compostion | | | Ti | | Polymerization | | |
| | Internal Donor | | | | | Activity | XI | MIL |
| Ex. | Structure/Name | % wt | % wt | ED | | kg/g | % wt | g/10' |
|---|---|---|---|---|---|---|---|---|
| 9 | 4-(butyl(ethoxycarbonyl)amino)pentan-2-yl 4-chlorobenzoate, syn/anti 8:2 | n.d. | 4.7 | C | | 44 | 97.3 | 0.5 |
| 10 | 4-(butyl(ethoxycarbonyl)amino)pentan-2-yl 4-fluorobenzoate, syn/anti 85:15 | 19.9 | 5.4 | D | | 62 | 97.9 | 0.5 |
| 11 | 4-((ethoxycarbonyl)(4-fluorophenyl)amino)pentan-2-yl 4-propylbenzoate, syn/anti 8:2 | 23.5 | 4.7 | D | | 56 | 98.4 | 0.3 |
| 12 | 4-(butyl(ethoxycarbonyl)amino)pentan-2-yl 3-methylbutanoate, syn/anti 75:25 | 14.4 | 4.9 | D | | 48 | 97.8 | 1.1 |
| Comp. Ex 1 | 4-(N-benzylbenzamido)pentan-2-yl benzoate | 13.8 | 4.4 | D | | 34 | 96.2 | 2.2 |

TABLE 1-continued

| | Catalyst composition | | | | Polymerization | | |
|---|---|---|---|---|---|---|---|
| | Internal Donor | | Ti | | Activity | XI | MIL |
| Ex. | Structure/Name | % wt | % wt | ED | kg/g | % wt | g/10' |
| 13 | 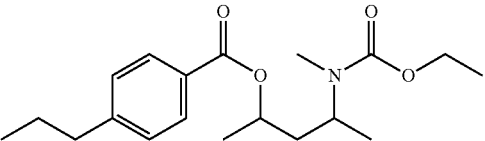 [SMILES: CCCc1ccc(C(=O)OC(C)CC(C)N(C)C(=O)OCC)cc1]<br>4-((ethoxycarbonyl)(methyl)amino)pentan-2-yl 4-propylbenzoate, syn/anti 8:2 | n.d. | 3.4 | C<br>No ED | 80<br>90 | 98.8<br>95.5 | 0.3<br>1.7 |

ED: External Donor.
D: dicyclopentyldimethoxysilane
C: methylcyclohexyldimethoxysilane
nd: not determined

What is claimed is:

1. A solid catalyst component for the polymerization of olefins comprising:
   (i) Mg,
   (ii) Ti and
   (iii) an electron donor of formula (I)

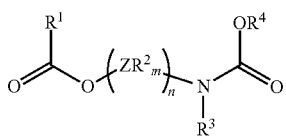

where independently, Z is selected from C, Si, Ge, O, N, S or P with the proviso that the atoms O, S, and N are not directly linked to either the ester oxygen or the carbamic nitrogen of the formula (I), the $R^2$ groups, equal to or different from each other, are hydrogen or a $C_1$-$C_{20}$ hydrocarbon radicals, optionally containing a heteroatom selected from halogen, P, S, N, O and Si, and wherein the $R^2$ groups can be fused together to form one or more cycles, m is a number satisfying the valences of Z and n is an integer ranging from 1 to 10, $R^1$ and $R^4$ are selected from $C_1$-$C_{15}$ hydrocarbon groups, optionally containing a heteroatom selected from halogen, P, S, N, and O; and $R^3$ group is selected from hydrogen $C_1$-$C_{15}$ hydrocarbon groups, optionally containing a heteroatom selected from halogen, P, S, N, and O.

2. The solid catalyst component according to claim 1, wherein the $(ZR^2_m)_n$ group of formula (I) is selected from the group consisting of aliphatic, alicyclic and aromatic bivalent radicals, optionally substituted with $C_1$-$C_{15}$ hydrocarbon groups and/or with heteroatoms selected from halogen, P, S, N, O and Si, in which n ranges from 1 to 6 atoms.

3. The solid catalyst component according to claim 2, wherein the $(ZR^2_m)_n$ group is an aliphatic or alicyclic bridging group in which n ranges from 1-6 carbon atoms.

4. The solid catalyst component according to claim 1, wherein $R^1$ groups are selected from aryl and alkylaryl groups.

5. The solid catalyst component according to claim 4, wherein $R^1$ groups are selected from phenyl groups.

6. The solid catalyst component according to claim 5, wherein the phenyl groups are substituted with halogen and/or $C_1$-$C_5$ alkyl groups.

7. The solid catalyst component according to claim 1, wherein $R^3$ groups are independently selected from hydrogen or $C_1$-$C_{10}$ alkyl groups.

8. The solid catalyst component according to claim 7, wherein $R^3$ groups are independently selected from $C_1$-$C_5$ alkyl groups.

9. The solid catalyst component according to claim 1, wherein the $R^4$ groups are selected from $C_1$-$C_{10}$ alkyl groups.

10. The solid catalyst component according to claim 9, wherein the $R^4$ groups are selected from $C_1$-$C_5$ alkyl groups.

11. The solid catalyst component according to claim 1, wherein the electron donor has the formula (III)

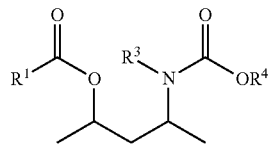

in which in which R1 groups are phenyl groups optionally substituted with halogen and/or $C_1$-$C_5$ alkyl groups, $R^3$ is hydrogen or $C_1$-$C_{20}$ hydrocarbon group, and $R^4$ is a $C_1$-$C_{10}$ alkyl group.

12. The solid catalyst component according to claim 11, wherein $R^3$ is hydrogen or methyl and $R^4$ is a $C_1$-$C_5$ alkyl group.

13. A catalyst for the polymerization of olefins comprising:
   a product of a reaction between:
   (i) a solid catalyst component comprising
      (a) Mg,
      (b) Ti and
      (c) an electron donor of formula (I)

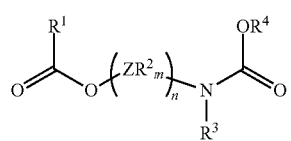

where independently, Z is selected from C, Si, Ge, O, N, S or P with the proviso that the atoms O, S, and N are not directly linked to either the ester oxygen or the carbamic nitrogen of the formula (I), the $R^2$ groups, equal to or different from each other, are hydrogen or a $C_1$-$C_{20}$ hydrocarbon radicals, optionally containing a heteroatom selected from halogen, P, S, N, O and Si, and wherein the $R^2$ groups can be fused together to form one or more cycles, m is a number satisfying the valences of Z and n is an integer ranging from 1 to 10, $R^1$ and $R^4$ are selected from $C_1$-$C_{15}$ hydrocarbon groups, optionally containing a heteroatom selected from halogen, P, S, N, and O; and $R^3$ group is selected from hydrogen, $C_1$-$C_{15}$ hydrocarbon groups, optionally containing a heteroatom selected from halogen, P, S, N, and O, (ii) an alkylaluminum compound and optionally,
  (iii) an external electron donor compound.

14. The catalyst according to claim 13 further comprising an external electron donor compound.

15. A process for the polymerization or copoymerization of olefins comprising:
  (A) polymerizing olefins having the formula $CH_2$=CHR, wherein R is hydrogen or a hydrocarbyl radical with 1-12 carbon atoms in the presence of a catalyst system, wherein the catalyst system comprises a product of a reaction between:
    i. the solid catalyst component comprising
      (a) Mg,
      (b) Ti and
      (c) an electron donor of formula (I)

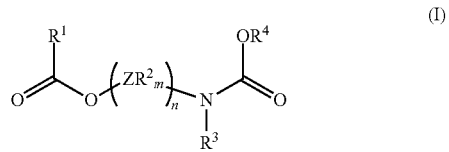

where independently, Z is selected from C, Si, Ge, O, N, S or P with the proviso that the atoms O, S, and N are not directly linked to either the ester oxygen or the carbamic nitrogen of the formula (I), the $R^2$ groups, equal to or different from each other, are hydrogen or a $C_1$-$C_{20}$ hydrocarbon radicals, optionally containing a heteroatom selected from halogen, P, S, N, O and Si, and wherein the $R^2$ groups can be fused together to form one or more cycles, m is a number satisfying the valences of Z and n is an integer ranging from 1 to 10, $R^1$ and $R^4$ are selected from $C_1$-$C_{15}$ hydrocarbon groups, optionally containing a heteroatom selected from halogen, P, S, N, and O; and $R^3$ group is selected from hydrogen, $C_1$-$C_{15}$ hydrocarbon groups, optionally containing a heteroatom selected from halogen, P, S, N, and O,
    ii. an alkylaluminum compound and,
    iii. optionally an external donor compound.

* * * * *

UNITED STATES PATENT AND TRADEMARK OFFICE
CERTIFICATE OF CORRECTION

PATENT NO. : 10,221,256 B2
APPLICATION NO. : 15/574807
DATED : March 5, 2019
INVENTOR(S) : Mignogna et al.

It is certified that error appears in the above-identified patent and that said Letters Patent is hereby corrected as shown below:

In the Specification

In Column 1, Line 27, delete "form" and insert -- from --

In the Claims

In Column 18, Claim 11, Line 44, after "in which" delete "in which"
In Column 19, Claim 15, Line 20, delete "copoymerization" and insert -- copolymerization --

Signed and Sealed this
Twenty-sixth Day of July, 2022

Katherine Kelly Vidal
*Director of the United States Patent and Trademark Office*